(12) United States Patent
Koh (10) Patent No.: US 11,834,044 B2
(45) Date of Patent: Dec. 5, 2023

(54) METHOD OF CONTROLLING ELECTRONIC PARKING BRAKE SYSTEM

(71) Applicants: Hyundai Motor Company, Seoul (KR); Kia Corporation, Seoul (KR)

(72) Inventor: Sang Bum Koh, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 291 days.

(21) Appl. No.: 17/511,304

(22) Filed: Oct. 26, 2021

(65) Prior Publication Data

US 2022/0396270 A1  Dec. 15, 2022

(30) Foreign Application Priority Data

Jun. 10, 2021 (KR) .................. 10-2021-0075131

(51) Int. Cl.
| | | |
|---|---|---|
| B60W 30/18 | (2012.01) | |
| B60W 10/06 | (2006.01) | |
| B60W 10/18 | (2012.01) | |
| F16H 59/18 | (2006.01) | |
| F16H 59/54 | (2006.01) | |
| B60T 8/17 | (2006.01) | |
| F16H 59/66 | (2006.01) | |

(52) U.S. Cl.
CPC ...... *B60W 30/18118* (2013.01); *B60W 10/06* (2013.01); *B60W 10/182* (2013.01); *F16H 59/18* (2013.01); *B60T 8/17* (2013.01); *B60T 2201/06* (2013.01); *B60W 2510/1005* (2013.01); *B60W 2540/103* (2013.01); *B60W 2552/15* (2020.02); *B60W 2710/186* (2013.01); *F16H 59/54* (2013.01); *F16H 2059/663* (2013.01)

(58) Field of Classification Search
None
See application file for complete search history.

(56) References Cited

U.S. PATENT DOCUMENTS

| | | | | |
|---|---|---|---|---|
| 4,629,043 A | * | 12/1986 | Matsuo | ............ B60T 13/746 477/92 |
| 5,984,429 A | * | 11/1999 | Nell | ............ B60T 8/4854 303/155 |
| 6,699,155 B2 | * | 3/2004 | Nagasaka | ......... F16H 59/0204 192/220 |
| 6,881,175 B2 | * | 4/2005 | Loibl | ............ B60T 7/042 477/182 |

(Continued)

*Primary Examiner* — Kevin R Steckbauer
(74) *Attorney, Agent, or Firm* — MORGAN, LEWIS & BOCKIUS LLP (57) ABSTRACT

In a method of controlling an electronic parking brake system to overcome an existing problem occurring in drive away release (DAR) mode, a control unit monitors whether or not a gear change signal is input in a vehicle stopped state, a P position state, or a parking brake applied state. When the gear change signal is input, an accelerator pedal input value of a driver is compared with a predetermined pedal input set value while a gear position of a transmission is maintained in the P position. When the accelerator pedal input value does not exceed the predetermined pedal input set value, a control operation is performed for automatic releasing of a parking brake. When a set time has passed after start of the control operation for the automatic releasing, a control operation of changing the gear position to the D position or the R position is performed.

20 Claims, 3 Drawing Sheets

(56) References Cited

U.S. PATENT DOCUMENTS

| | | | | |
|---|---|---|---|---|
| 6,905,181 | B2* | 6/2005 | Iwagawa | B60T 8/17616 |
| | | | | 701/76 |
| 7,665,808 | B2* | 2/2010 | Deprez | B60T 7/122 |
| | | | | 188/DIG. 2 |
| 7,974,760 | B2* | 7/2011 | Rowley | F16H 61/0059 |
| | | | | 701/67 |
| 8,447,475 | B2* | 5/2013 | Desfriches | B60W 30/18118 |
| | | | | 477/92 |
| 8,579,765 | B2* | 11/2013 | Yu | B60W 10/188 |
| | | | | 477/184 |
| 8,718,867 | B2* | 5/2014 | Monti | B60T 17/22 |
| | | | | 701/29.2 |
| 9,216,740 | B2* | 12/2015 | Kato | B60W 30/18063 |
| 9,457,811 | B2* | 10/2016 | Yu | B60W 30/18054 |
| 9,481,352 | B2* | 11/2016 | Yu | B60W 30/18027 |
| 9,624,893 | B2* | 4/2017 | Falaise | F02N 11/0837 |
| 10,005,461 | B2* | 6/2018 | Yu | B60W 10/115 |
| 10,029,686 | B2* | 7/2018 | Chen | B60W 10/02 |
| 10,146,227 | B2* | 12/2018 | Tanaka | B60W 50/14 |
| 10,421,456 | B2* | 9/2019 | Khafagy | F02N 11/0822 |
| 10,759,429 | B2* | 9/2020 | Coullard | B60W 30/18118 |
| 11,192,529 | B2* | 12/2021 | Kamio | B60T 7/045 |
| 11,193,580 | B2* | 12/2021 | Eichhorn | F16H 59/12 |
| 11,198,420 | B2* | 12/2021 | Trappe, III | B60T 13/662 |
| 11,260,842 | B2* | 3/2022 | Smith | B60T 7/02 |
| 11,654,780 | B2* | 5/2023 | Reuter | B60L 7/10 |
| | | | | 701/22 |
| 11,745,708 | B2* | 9/2023 | Bakewell | B60W 30/18063 |
| | | | | 701/70 |
| 2006/0049691 | A1* | 3/2006 | Deprez | B60W 10/182 |
| | | | | 303/191 |
| 2022/0396270 | A1* | 12/2022 | Koh | B60W 30/18118 |

* cited by examiner

METHOD OF CONTROLLING ELECTRONIC PARKING BRAKE SYSTEM

CROSS-REFERENCE TO RELATED APPLICATION

The present application claims priority to Korean Patent Application No. 10-2021-0075131, filed Jun. 10, 2021, the entire contents of which is incorporated herein for all purposes by this reference.

BACKGROUND OF THE INVENTION

Field of the Invention

The present invention relates to a method of controlling an electronic parking brake (EPB) system, and more particularly, to a method of controlling an electronic parking brake system to overcome an existing problem occurring in drive away release (DAR) mode when the parking brake is applied, improving the usability of a DAR function.

Description of Related Art

An electronic parking brake (EPB) system is an apparatus that realizes a parking brake function using power from a motor to keep a parked vehicle motionless. The EPB system generates braking force using power from the motor operating by receiving an electrical signal.

Described in more detail, the EPB system is configured to generate parking braking force (or braking force) from a motor on caliper (MOC) actuator using a motor. When the motor moves a nut forward by rotating a spindle, the nut pushes a piston of a caliper to bring a pad into contact with a disk, generating parking braking force.

The EPB system may operate in manual operation mode in which parking braking force is generated in a response to the braking operation of the driver. Furthermore, predetermined control units inside the vehicle may work in concert to automatically apply or release the parking brake or to operate the parking brake even in an emergency while the vehicle is driving, so that braking stability may be obtained.

As described above, the EPB system may perform both the static braking function to provide braking force while the vehicle is stopped and the dynamic braking function, i.e., an emergency braking function provided for a breakdown occurring while the vehicle is driving.

The EPB system is configured to automatically operate when the vehicle is turned off, and recently, is configured to perform a drive away release (DAR) function as an additional function.

The DAR function is a function of automatically releasing the parking brake when the driver presses the accelerator pedal for departure in a situation in which the parking brake is applied. The DAR function may release the parking brake without requiring the driver to press a button (i.e., a switch) when the vehicle starts after the parking brake was applied. Thus, the DAR function may be regarded as improving the convenience of the driver.

However, according to the characteristics of the DAR function in which the parking brake is released in a response to the driver pressing the accelerator pedal, the accelerator pedal is pressed when the parking brake is released. Here, the engine torque of the vehicle is being continuously increased while the parking braking force is fading out. Thus, when the vehicle starts to move, the driver may feel as if the vehicle suddenly lurches (or rushes) temporarily.

When the electronic parking brake in the applied state is released in a response to the accelerator pedal being operated, the acceleration of the vehicle rapidly increases at the moment that the parking brake is released, so that the driver may be startled. Compared to other situations in which the vehicle starts in a situation in which the parking brake is not activated, the driver may feel rapid acceleration of the vehicle and thus complain anxiousness. Therefore, another automatic release function may be introduced in some cases, but the application thereof is difficult due to the characteristics of the transmission.

The information disclosed in this Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing a method of controlling an electronic parking brake (EPB) system to overcome an existing problem occurring during the operation of a drive away release (DAR) function that automatically releases the parking brake, improving the usability of the DAR function.

The objective of the present invention is not limited to the aforementioned description, and other objectives not explicitly included herein will be clearly understood by those having ordinary knowledge in the field to which various exemplary embodiments of the present invention pertains (hereinafter, referred to as "those skilled in the art") from the description provided hereinafter.

In various aspects of the present invention, there is provided a method of controlling an electric parking brake system, the method including: monitoring, by a control unit, whether or not a gear change signal for changing a gear position to a drive (D) position or a reverse (R) position is input in a vehicle stopped state, a park (P) position state, or a parking brake applied state; when the gear change signal is input, comparing, by the control unit, an accelerator pedal input value of a driver with a predetermined pedal input set value while maintaining a gear position of a transmission in the P position; when the accelerator pedal input value is equal to or greater than the predetermined pedal input set value, performing, by the control unit, a control operation for automatic releasing of a parking brake; and when a set time has passed after start of the control operation for the automatic releasing of the parking brake, performing, by the control unit, a control operation of changing the gear position of the transmission to the D position or the R position.

Furthermore, the method may further include, when the gear change signal is input, determining, by the control unit, whether or not a vehicle is located on a flat surface of a road in accordance with a gradient of the road detected by a gradient detector. When the vehicle is determined to be located on the flat surface, the control unit may compare the accelerator pedal input value with the predetermined pedal input set value and subsequent steps.

Furthermore, in the determining of whether or not the vehicle is located on the flat surface, the control unit may compare the gradient of the road detected by the gradient detector with a predetermined set gradient, and when the detected gradient of the road is equal to or smaller than the predetermined set gradient, determine the vehicle to be located on the flat surface.

Furthermore, in the comparing of the accelerator pedal input value with the predetermined pedal input set value, the control unit may control information regarding the D position or the R position indicated by the gear change signal to be previously displayed on a cluster while maintaining the gear position of the transmission in the P position.

Furthermore, the method may further include: when the accelerator pedal input value is equal to or greater than the predetermined pedal input set value, determining, by the control unit, whether or not predetermined operation conditions for the automatic releasing of the parking brake are met. When the predetermined operation conditions are met, the control unit may perform a control operation for the automatic releasing of the parking brake and perform a control operation to change the gear position of the transmission to the D position or the R position.

Here, the predetermined operation conditions may include a condition requesting that a driver's seat belt is fastened or the driver's seat belt and a passenger's seat belt are fastened.

Furthermore, when the predetermined operation conditions are not met, the control unit may control a message requesting that the operation conditions be met to be displayed on a cluster.

Furthermore, the method may further include controlling, by the control unit, an operation of a drive unit of driving a vehicle so that driving force reduced from driving force of a normal output control is output in accordance with a target driving force determined from the accelerator pedal input value and the predetermined pedal input set value after the control operation of changing the gear position of the transmission to the D position or the R position.

Furthermore, the controlling of the operation of the drive unit may include: comparing, by the control unit, the accelerator pedal input value after the control operation of changing the gear position of the transmission to the D position or the R position with the predetermined pedal input set value, and when the accelerator pedal input value is equal to or greater than the predetermined pedal input set value; determining a corrected input value by multiplying a difference between the accelerator pedal input value and the predetermined pedal input set value with a predetermined driving force reduction ratio smaller than 1; and controlling the operation of the drive unit to output the reduced driving force corresponding to the determined corrected input value.

Furthermore, when the driver is determined to have detached a foot from an accelerator pedal after the control operation of changing the gear position of the transmission to the D position or the R position, the control unit may perform a normal output control operation to control the operation of the drive unit to output normal driving force corresponding to the accelerator pedal input value afterwards.

Furthermore, when the accelerator pedal input value after the control operation of changing the gear position of the transmission to the D position or the R position is smaller than the predetermined pedal input set value, the control unit may perform a fine output control operation of controlling the operation of the drive unit to output predetermined fine driving force.

Furthermore, the method may further include: when the vehicle is determined to be located on an inclined surface of the road having a gradient greater than the predetermined set gradient, performing, by the control unit, the control operation of changing the gear position of the transmission to the D position or the R position; controlling the operation of the drive unit to output driving force corresponding to the accelerator pedal input value of the driver; and comparing, by the control unit, the accelerator pedal input value with a predetermined default value, and when the accelerator pedal input value is equal to or greater than the predetermined default value, performing the control operation for the automatic releasing of the parking brake.

According to the method of controlling an EPB system according to various exemplary embodiments of the present invention, it is possible to overcome the existing problem in which a vehicle lurches due to rapid acceleration in the activation of the DAR function designed to automatically release the parking brake in a response to a driver operating the accelerator pedal in the applied state of the electronic parking brake, improving the usability of the DAR function.

Furthermore, according to various exemplary embodiments of the present invention, even in the case that no other automatic release functions have not been used due to the characteristics of the transmission or other reasons, it is possible to provide the DAR function able to minimize the lurching by only changing a logic without an increase in costs or components and to contribute in increasing the productivity of a vehicle and preventing the vehicle from deteriorating.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of embodiments of the present invention disclosed herein are only for illustrative purposes of the exemplary embodiments of the present invention. The present invention may be embodied in various forms without departing from the spirit and significant characteristics of the present invention. Furthermore, the present invention is directed to cover not only the exemplary embodiments of the present invention, but also various alternatives, modifications, equivalents and other embodiments which may be included within the spirit and scope of the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled", "connected", or "linked" to another element, it may be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

The terminology used herein is for describing various exemplary embodiments only and is not intended to be limiting. Throughout the specification, the same reference numerals will refer to the same or like parts. The terminologies used herein are for describing various exemplary embodiments only and are not intended to limit the present invention. As used herein, singular forms are intended to include plural forms as well, unless the context clearly indicates otherwise. It will be further understood that the terms "comprise", "include", "have", etc when used in various exemplary embodiments of the present invention, specify the presence of stated features, integers, steps, operations, elements, components, and/or combinations thereof but do not preclude the presence or addition of one or more other features, integers, steps, operations, elements, components, and/or combinations thereof.

The present invention is directed to providing a method of controlling an electronic parking brake (hereinafter, referred to as "EPB") to remove an existing problem of rapid acceleration that occurs during the operation of a drive away release (DAR) function that automatically releases the applied state of the parking brake when a driver operates an accelerator pedal, improving the usability of the DAR function. The present invention is applicable to a vehicle on which a shift by wire (SBW) transmission is mounted.

A mechanical coupling structure has been applied between the shift lever (or the gear stick) and the transmission using a cable or a shaft. As a solution substituting for the present mechanical automatic transmission, the SBW (or e-shifter) transmission is known in the art. In the SBW transmission, a shift operation input of the driver is converted into a shifting signal (or a shift operation signal), which is then transmitted to a transmission control unit. The transmission control unit controls the operation of the transmission in a response to the shifting signal and depending on vehicle driving conditions to actually perform shifting.

In various exemplary embodiments of the present invention, even in the case that the driver moves the gearshifting from the park (P) position to the drive (D) position (i.e., a shifting signal directing the D position is input) to start the vehicle in the EPB applied state, the P position is maintained for a while, and when the driver presses the accelerator pedal, is shifted to the D position at a suitable point in time after the releasing of the EPB is started, so that driving force is generated.

In this regard, in various exemplary embodiments of the present invention, cooperative control among a brake control unit (BCU), a transmission control unit (TCU), and a drive control unit is necessary. Here, the brake control unit may be an EPB control unit, whereas the transmission control unit may be an SBW control unit. Furthermore, the drive control unit may be an engine control unit (ECU).

The present invention is directed to start the generation of the driving force at the end of the EPB releasing process in consideration that a predetermined short period is required during shifting from the P position (i.e., the park position) to the D position (i.e., the drive position), minimizing the rapid acceleration of the related art, in which the vehicle lurches temporarily. Here, the driving force may be force for driving the vehicle, i.e., power generated by a drive unit that propels the vehicle. The driving force may also be power generated by the engine (i.e., engine power) or power generated by a drive motor (i.e., motor power) to propel the vehicle.

Figure 1:
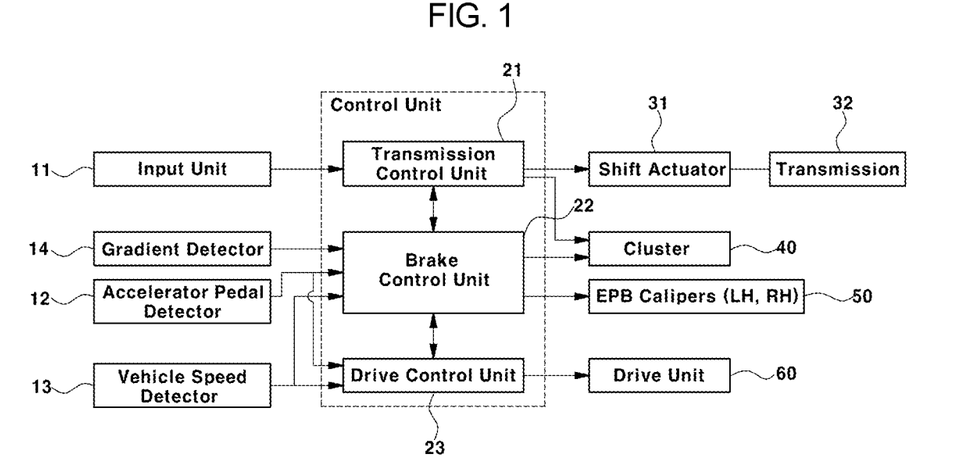
FIG. 1 is a block diagram illustrating a configuration of an apparatus of controlling an electronic parking brake system according to various exemplary embodiments of the present invention.

FIG. 1 is a block diagram illustrating a mechanical configuration for controlling an EPB system according to various exemplary embodiments of the present invention, including: an input unit 11 configured to be operated by a driver for shifting; an accelerator pedal detector 12 detecting the state of the accelerator pedal operated by the driver; a vehicle speed detector 13 detecting the speed of the vehicle; a gradient detector 14 detecting information regarding the gradient of a road on which the vehicle is located; a transmission control unit 21 controlling the operation of a transmission 32; a brake control unit 22 controlling the operation of a parking brake; a drive control unit 23 controlling the operation of a drive unit 60 provided as a vehicle drive system; and the parking brake 50 mounted on wheels.

Here, the input unit 11 may be a button, a switch, a dial, a knob, or the like provided in the cabin of a vehicle in which the SBW transmission is used such that the driver operates the input unit 11 for shifting. The driver may selectively change the shifter to one of the park (P) position, the drive (D) position, the reverse (R) position, and the neutral (N) position by operating the input unit 11. The input unit 11 converts a driver operation input into an electrical signal, i.e., a shifting signal (or a shift operation signal), and transmits the shifting signal to the transmission control unit 21.

The accelerator pedal detector 12 is configured to detect an accelerator pedal input value (i.e., an APS value) input from the driver. The accelerator pedal detector 12 may be a typical accelerator pedal sensor configured for detecting the position of the accelerator pedal in the vehicle, i.e., an accelerator position sensor (APS).

The vehicle speed detector 13 is configured to detect the speed of the vehicle. The vehicle speed detector 13 may include a wheel speed sensor disposed on a wheel. As is well-known in the art, information regarding the real-time speed of the vehicle may be obtained from a signal from the wheel speed sensor.

Furthermore, the gradient detector 14 may be a typical longitudinal acceleration sensor (i.e., a G sensor) detecting the longitudinal acceleration of the vehicle. Acquisition of information regarding the gradient of the road on which the vehicle is located from the signal of the longitudinal acceleration sensor is well-known to those skilled in the art, and thus, a detailed description thereof will be omitted. In various exemplary embodiments of the present invention, the gradient may mean an angle of inclination with respect to a horizontal plane or a gradient ratio which is a ratio of a vertical height with respect to a horizontal distance, expressed as a percentage.

The transmission control unit 21 may be an SBW control unit in a vehicle in which the SBW transmission is provided. The transmission control unit 21 is configured to receive the gear change signal transmitted from the input unit 11. Here, the transmission control unit 21 controls the operation of the transmission 32 through a shift actuator (or SBW actuator) 31 so that shifting is actually performed on the basis of the gear change signal. The transmission control unit 21 also performs a control operation by which information regarding the gear position selected by the driver is displayed on a cluster 40.

The brake control unit 22 may be an EPB control unit. The brake control unit 22 receives signals from the accelerator pedal detector 12, the gradient detector 14, and the vehicle speed detector 13 to control the EPB system according to various exemplary embodiments of the present invention. Furthermore, the brake control unit 22 performs cooperative control together with the transmission control unit 21 and the drive control unit 23. For example, the brake control unit 22 may control the generation of the driving force of the drive unit 60 through the cooperative control with the drive control unit 23.

Furthermore, the brake control unit 22 controls the operation of the parking brake (or EPB calipers) 50 disposed on wheels. The brake control unit 22 may be configured to control a current (i.e., a motor induced current) applied to a motor of the parking brake 50 to control the operation of the motor of the parking brake 50.

Furthermore, when the state of the driver does not meet predetermined DAR activation conditions, the brake control unit 22 performs a control operation to output a message requesting that the driver fasten his or her seat belt or the like. For example, the brake control unit 22 may perform a control operation by which a pop-up message is output on the cluster 40.

The drive control unit 23 is a control unit controlling the operation of the drive unit 60 provided as a vehicle drive system. Furthermore, the drive control unit 23 is basically configured to receive a signal from the accelerator pedal detector 12 to control the driving force. The drive unit 60 may be an engine in an internal combustion engine (ICE) vehicle, in case of which the drive control unit 23 is an engine control unit (ECU).

Alternatively, the drive unit 60 may be an electric motor (i.e., a drive motor) for driving the vehicle in an electric vehicle. Here, the drive control unit 23 may include a group of control units serving to control the power of the electric motor, for example, higher level control units, such as a vehicle control unit (VCU) and a motor control unit (MCU).

The parking brake 50 may include EPB calipers disposed on the wheels. The parking brake 50 may include an EPB caliper disposed on the left rear wheel and an EPB caliper disposed on the right rear wheel.

A control process for the EPB system according to various exemplary embodiments of the present invention may be performed by cooperative control of a plurality of control units, as illustrated in FIG. 1. The control process may be performed by a single integrated controller in place of the plurality of control units. Both the plurality of control units and the single integrated controller may be collectively referred to as a control unit. The control process for the EPB system according to various exemplary embodiments of the present invention may be regarded as being performed by the control unit. Hereinafter, a control unit described hereinafter may refer to the collectively-referred controller or one of the above-described control units.

Figure 2:
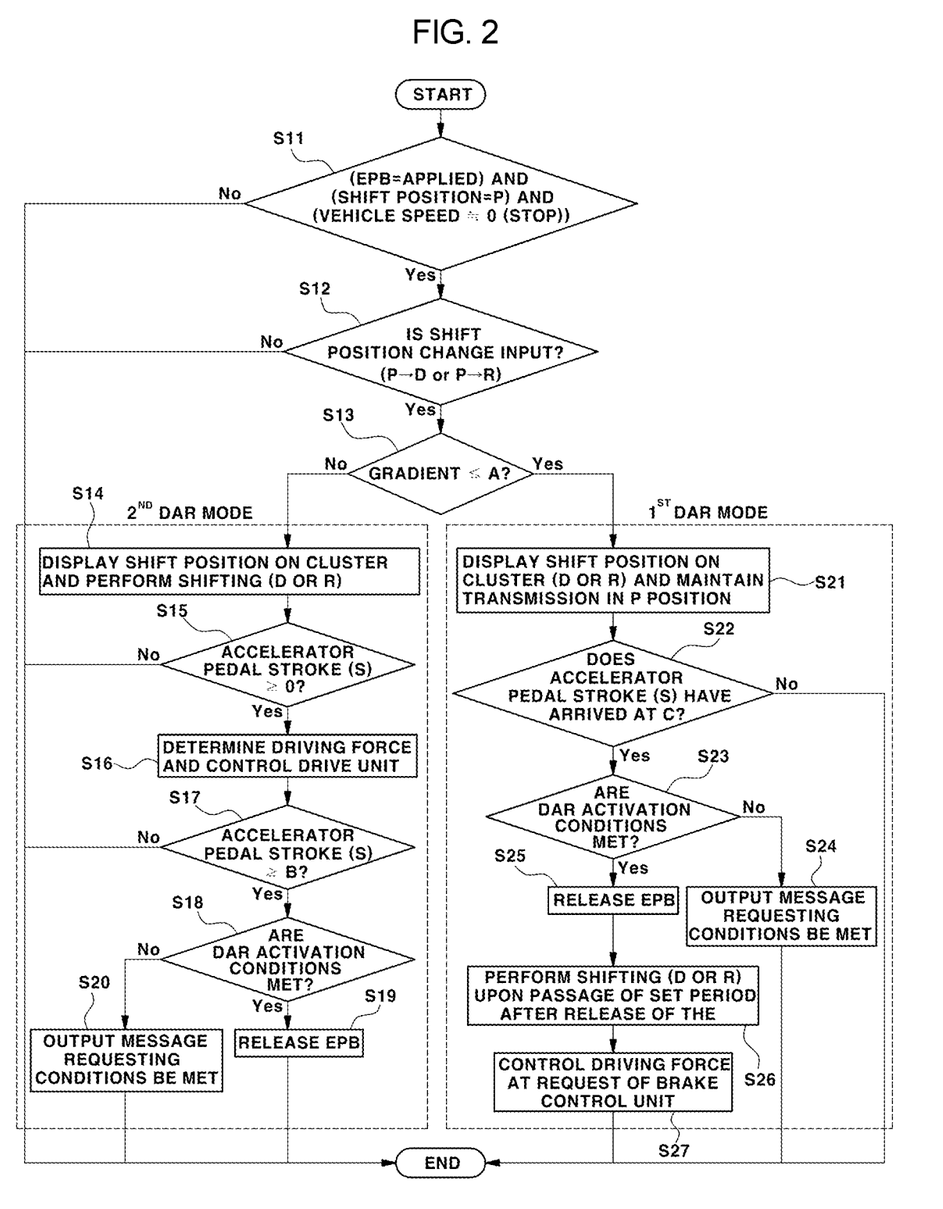
FIG. 2 is a flowchart illustrating a process of controlling an electronic parking brake system according to various exemplary embodiments of the present invention.

FIG. 2 is a flowchart illustrating a process of controlling an EPB system according to various exemplary embodiments of the present invention. First, in S11, the control unit (i.e., the brake control unit) determines current states, i.e., determines whether the EPB is in an applied state, the gear position is in the P position, and the speed of the vehicle detected by the vehicle speed detector 13 corresponds to the stop speed (≈0 km/hr). The EPB applied state means that the parking brake is holding the wheels by generating parking braking force, and has the opposite meaning to the released state in which the parking braking force is not generated.

When all of the conditions, including the EPB applied state, the P position, and the stop speed state, are met, the control unit monitors whether or not a signal indicating a shifting from the P position to the D position or from the P position to the R position is input from the input unit 11, i.e., a gear change signal is input from the driver, in S12.

When the signal indicating a shifting from the P position to the D position or from the P position to the R position is input, the control unit (i.e., the brake control unit) determines whether or not the vehicle is located on a flat surface according to information regarding the current road gradient detected by the gradient detector 14. In this regard, in S13, the control unit may be configured to determine the vehicle to be located on a flat surface when the current gradient is equal to or smaller than a set gradient A (gradient≤A).

Here, when the vehicle is determined to be located on an inclined surface having a gradient exceeding the predetermined set gradient A, a control operation for activating a second DAR mode is performed. Here, the second DAR mode is a DAR mode in which the existing control process for the DAR operation is performed. In various exemplary embodiments of the present invention, the second DAR mode is only activated when the vehicle is located on an inclined surface.

In contrast, when the vehicle is determined to be located on a flat surface having a gradient equal to or smaller than the predetermined set gradient A, the control unit is configured to perform a control operation to activate the first DAR mode. Here, the first DAR mode is a flat surface DAR mode in which a novel control process provided according to various exemplary embodiments of the present invention is performed for the DAR operation.

Here, the predetermined set gradient A is a gradient previously set in the control unit to distinguish the inclined surface and the flat surface and is a gradient by which the modes are divided. Furthermore, the predetermined set gradient is the maximum gradient at which the first DAR mode may be activated. In various exemplary embodiments of the present invention, the gradient of a current position of the road is compared with the predetermined set gradient A. When the current position is determined to be a flat surface having a gradient equal to or smaller than the predetermined set gradient A, the first DAR mode is activated. When the current position is determined to be an inclined surface having a gradient exceeding the predetermined set gradient A, the second DAR mode is activated.

When the first DAR mode is activated in inclined surface conditions excluding flat surfaces, the vehicle may roll back since a point in time at which driving force is generated is late. During the rolling back on the inclined surface, the parking pawl may be damaged during the change from the P position to the D position. Thus, in inclined surface conditions excluding flat surfaces, the existing DAR mode, i.e., the second DAR mode, is activated.

Describing the second DAR mode, when the vehicle is on an inclined surface, the control unit (i.e., the transmission control unit) performs a control operation by which information regarding the D position or the R position (i.e., the gear position indicated by the gear change signal), into which the gear position has been changed by the driver, is displayed on the cluster 40, and then performs moving the gear position to the D position or the R position in S14.

Subsequently, in S15, the control unit (i.e., the brake control unit) monitors whether or not the driver operates the accelerator pedal according to the signal from the accelerator pedal detector 12. When an accelerator pedal input value (i.e., an accelerator pedal stroke or APS value) S of the driver is equal to or greater than 0 (S≥0), the control unit determines that the driver is operating the accelerator pedal (i.e., an accelerator pedal input is occurring).

Furthermore, in S16, the control unit (i.e., the drive control unit and the ECU) determines a target driving force (or required torque) on the basis of the accelerator pedal input value S of the driver and controls the operation of the drive unit (e.g., the engine) 60 to generate driving force corresponding to the above-determined target driving force (i.e., a target value of the driving force control). Consequently, the driving force of the vehicle corresponding to the accelerator pedal input value S may be generated. Here, the control unit may be configured to determine the target driving force corresponding to the accelerator pedal input value S using a target driving force map.

Here, the driving force map is a map of data on which the correlation of the accelerator pedal input value (i.e., the accelerator pedal stroke value) S and the target driving force (i.e., the target value of the driving force control) is defined. On the driving force map, the target driving force is set to be a value corresponding to the accelerator pedal input value S.

Subsequently, in S17, the control unit compares the accelerator pedal input value S with a default B. When the accelerator pedal input value S is equal to or greater than the predetermined default value B, the control unit determines whether or not the driver state meets predetermined DAR activation conditions according to information collected in the vehicle in S18. Here, the predetermined default value B is a minimum stroke value of the accelerator pedal input value, i.e., the accelerator pedal stroke S, required for obtaining driving force before the release of the EPB on the inclined surface.

Subsequently, when DAR activation conditions are met as described above, the control unit (i.e., the brake control unit) releases the EPB in S19. When DAR activation conditions are not met, the control unit is configured to perform a control operation by which a pop-up message requesting DAR activation conditions be met is displayed on the cluster 40 in S20.

Here, DAR activation conditions include a condition requiring that a driver or both a driver and passengers fasten seat belts. When a signal from a seatbelt switch indicates that a driver or both a driver and passengers have fastened the seat belts, the control unit may determine DAR activation conditions to be met.

Furthermore, in S21, when the vehicle is located on a flat surface having a gradient equal to or smaller than the predetermined set gradient A, the control unit (i.e., the transmission control unit) maintains the gear position to be in the P position without moving to the D position or the R position even in the case that information regarding the D position or the R position, i.e., the gear position changed by the input of the driver, has been previously displayed on the cluster 40.

Subsequently, the control unit (i.e., the brake control unit and the TCU) controls the accelerator pedal input value (i.e., the APS value or the accelerator pedal stroke value) S obtained from the signal from the accelerator pedal detector 12 with a predetermined pedal input threshold C in S22. Here, the pedal input threshold C means a minimum stroke value for the release of the EPB.

Here, in S23, when the accelerator pedal input value S is increased to be equal to or greater than the pedal input threshold C (S≥C), the control unit (i.e., the brake control unit and the TCU) determines whether or not set DAR activation conditions are met. When DAR activation conditions are not met, the control unit is configured to perform a control operation by which a pop-up message requesting that DAR activation conditions be met is displayed on the cluster 40 in S24.

DAR activation conditions in the first DAR mode may be set to be the same as in the second DAR mode. That is, in the first DAR mode, DAR activation conditions may include the condition requesting that a driver or both a driver and passengers fasten seat belts. Thus, when seat belts are fastened on a flat surface, the control unit may determine that DAR activation conditions are met currently.

As described above, in S25, when DAR activation conditions are determined to be met, the control unit (i.e., the brake control unit) performs a control operation to release the EPB. Upon the passage of a set period after the release of the EPB, the control unit is configured to perform a control operation to change the gear position of the transmission 32 in S26. Here, the set period is a delay time previously set by the control unit to delay the change to the D position or the R position after the releasing of the EPB is started.

Subsequently, in S27, the control unit (i.e., the drive control unit) determines the target driving force (or the required torque) on the basis of the accelerator pedal input value S of the driver and controls the operation of the drive unit (e.g., the engine) 60 to generate intended driving force on the basis of the determined target driving force, so that the driving force of the vehicle corresponding to the accelerator pedal input value S may be generated. In the instant case, in the first DAR mode, control over the driving force is performed by cooperative control of the brake control unit 22 and the drive control unit 23. At the instant time, at the request of the brake control unit 22, the drive control unit 23 controls the operation of the drive unit 60 to generate driving force smaller than the driving force of the second DAR mode when accelerator pedal input value (i.e., accelerator pedal stroke value) conditions are the same.

Figure 3:
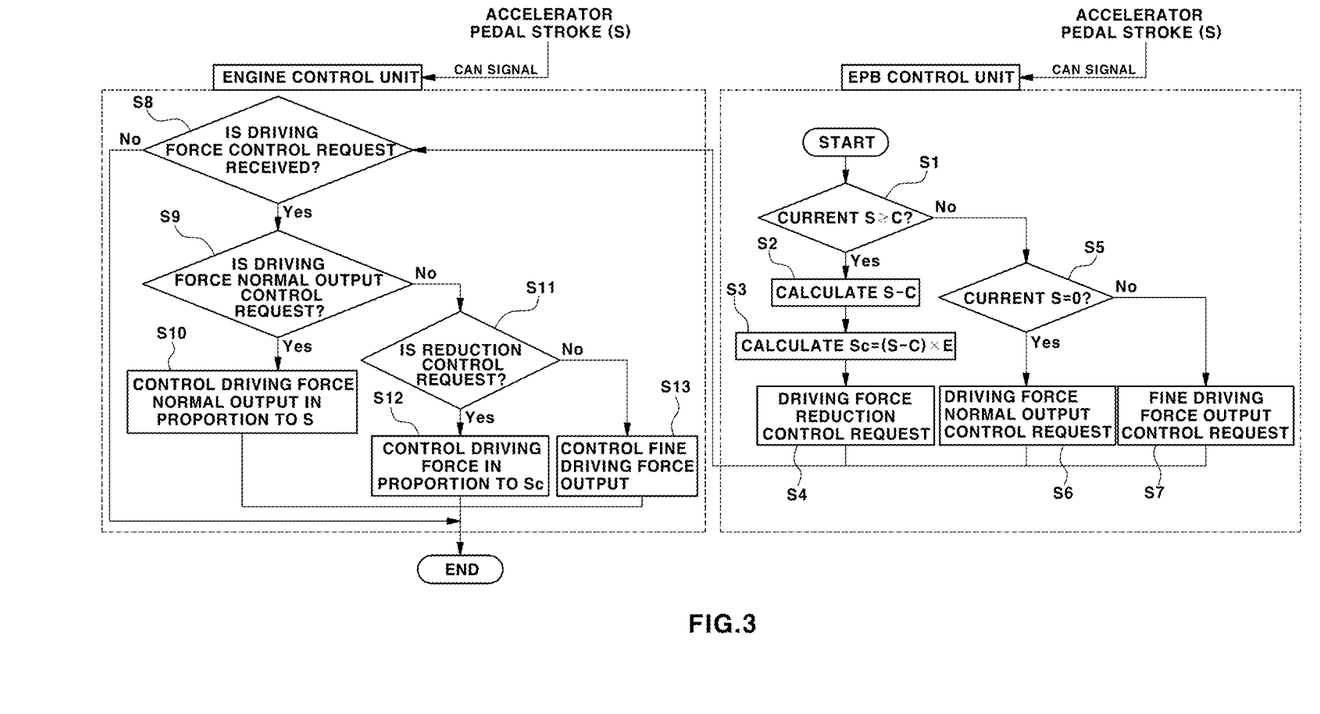
FIG. 3 is a flowchart illustrating a process of controlling driving force in a process of controlling an electronic parking brake system according to various exemplary embodiments of the present invention.

Hereinafter, the process of generating driving force and the control process therefor in the first DAR mode will be described in more detail. FIG. 3 is a flowchart illustrating a driving force control process performed by cooperative control of the brake control unit (i.e., the EPB control unit) 22 and the drive control unit (i.e., the engine controller) 23.

Here, the brake control unit 22 may be an EPB control unit, and the drive control unit 23 may be an engine control unit. The process illustrated in FIG. 3 is the process of the step S27 following the step S26 illustrated in FIG. 2.

First, after the step S26 illustrated in FIG. 2, in S1, the accelerator pedal input value, i.e., the accelerator pedal stroke value S, detected by the accelerator pedal detector 12 is compared again with the pedal input threshold C. When the accelerator pedal stroke value S is equal to or greater than the pedal input threshold C (S≥C), the brake control unit (i.e., the EPB control unit) 22 determines the difference S−C between the current accelerator pedal input value S and the pedal input threshold C in S2.

Subsequently, in S3, the brake control unit 22 determines a corrected input value Sc by multiplying the difference S−C between the accelerator pedal input value S and the pedal input threshold C with a predetermined driving force reduction ratio E. That is, when S indicates the current accelerator pedal input value, C indicates the pedal input threshold, and E indicates the driving force reduction ratio, the corrected input value Sc may be determined by the formula: Sc=(S−C)×E. Here, the driving force reduction ratio E is previously set in the brake control unit 22 to be a value smaller than 1 to prevent rapid acceleration.

When the corrected input value Sc is determined as above, the brake control unit (i.e., the EPB control unit) 22 transfers the corrected input value Sc to the drive control unit (i.e., the control unit) 23, and at the same time, requests that the drive control unit 23 perform driving force reduction control to generate reduced driving force on the basis of the corrected input value Sc in S4.

Consequently, the drive control unit 23 controls the operation of the drive unit by use of the corrected input value Sc as the accelerator pedal input value in S8, S9, S11, and S12. First, target driving force corresponding to the corrected input value Sc on the driving force map is determined. Here, the driving force map is a map of set data by which the correlation between the accelerator pedal input value and the target driving force is defined. On the driving force map, the target driving force is set to be a value corresponding to the accelerator pedal input value. In the driving force reduction control, the drive control unit 23 determines the target driving force corresponding to the corrected input value Sc from the driving force map by use of the corrected input value Sc as the accelerator pedal input value.

When the target driving force (i.e., a target value of the driving force control) corresponding to the corrected input value Sc is determined on the basis of the driving force map as described above, the drive control unit 23 controls the operation of the drive unit (e.g., the engine) 60 to generate driving force corresponding to the target driving force.

The corrected input value Sc is a value smaller than the current accelerator pedal input value (i.e., the accelerator pedal stroke value) S detected by the accelerator pedal detector 12. On the driving force map, the target driving force is set to increase/decrease in proportion to the accelerator pedal input value. Thus, when the target driving force is determined using the corrected input value Sc as the accelerator pedal input value on the driving force map, the target driving force Sc corresponding to the corrected input value is smaller than the target driving force corresponding to the current accelerator pedal input value S.

Thus, even in the case that the accelerator pedal input value of the driver is the same, adjustment is performed so that the drive unit (e.g., the engine) 60 in the first DAR mode generates a smaller amount of driving force than in the second DAR mode. Consequently, the vehicle starts slowly moving without rapid acceleration.

After the step S26 illustrated in FIG. 2, when the current accelerator pedal input value (i.e., the accelerator pedal stroke value) S detected by the accelerator pedal detector 12 is 0 (S=0) indicating that the driver has detached his or her foot from the accelerator pedal in S5, the brake control unit (i.e., the EPB control unit) 22 requests that the drive control unit (i.e., the engine control unit) 23 perform driving force normal output control in S6.

Here, in S8, S9, and S10, the drive control unit 23 determines the target driving force using the driving force map, on the basis of the accelerator pedal input value S detected afterwards by the accelerator pedal detector 12, and accordingly, controls the operation of the drive unit (e.g., the engine) 60 to generate driving force corresponding to the target driving force determined as above. In the first DAR mode as described above, at the moment that the driver detaches the his or her from the accelerator pedal (S=0) after the EPB is released, the driving force control and the output return to normal mode. Afterwards, when the driver presses the accelerator pedal again, the drive control unit 23 controls the drive unit 60 to generate and output normal driving force in proportion to the accelerator pedal input value S.

Furthermore, after the step S26 illustrated in FIG. 2, when the current accelerator pedal input value S detected by the accelerator pedal detector 12 is greater than 0 and smaller than the pedal input threshold C (0<S<C), the brake control unit (i.e., the EPB control unit) 22 requests that the drive control unit 23 perform driving force fine output control in S7.

Consequently, the drive control unit 23 controls the drive unit 60 to output fine driving force in S8, S9, S11, and S13). That is, in the fine output control, the drive control unit 23 controls the operation of the drive unit 60 to output a predetermined amount of fine driving force. The fine driving force is a target driving force value for generation and control of driving force in the fine output control. The fine driving force is set to be a value smaller than the target driving force of when the accelerator pedal input value S is equal to or greater than pedal input threshold C (S≥C).

The fine driving force is set to the drive control unit 23 as an output value of the drive unit 60 preventing the vehicle from rolling back when the gradient is the predetermined set gradient A (i.e., the maximum gradient determined to be a flat surface). The fine driving force is determined to be the minimum output value of the drive unit 60 preventing the vehicle from rolling back when the gradient is the predetermined set gradient A.

As a result, in a condition in which the accelerator pedal input value is greater than 0 and smaller than the pedal input threshold C, the drive control unit 23 controls the operation of the drive unit 60 to generate and output a level of fine driving force able to prevent the vehicle from rolling back. When the driver has pressed the accelerator pedal with a stroke value smaller than the pedal input threshold C as described above, the fine driving force may be generated and output by the drive unit 60, so that the vehicle does not roll back on an inclined surface having a small or fine gradient.

According to the method of controlling an electronic parking brake according to various exemplary embodiments of the present invention as set forth above, it is possible to prevent the existing lurching (or rapid acceleration) problem occurring during the activation of the DAR function that automatically releases the parking brake from the applied state by changing a logic without an increase in costs or components.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an electric parking brake system, the method comprising:
    monitoring, by a control unit, whether or not a gear change signal for changing a gear position of a transmission to a drive position or a reverse position is input in a vehicle stopped state, a park position state, or a parking brake applied state;
    in response to the gear change signal being input, comparing, by the control unit, an accelerator pedal input value with a predetermined pedal input set value while maintaining the gear position of the transmission in the park position;
    in response to the accelerator pedal input value being equal to or greater than the predetermined pedal input set value, performing, by the control unit, control for automatic releasing of a parking brake; and
    in response to a set time passing after start of the control for the automatic releasing of the parking brake, performing, by the control unit, a control of changing the gear position of the transmission to the drive position or the reverse position.

2. The method of claim 1, further including, when the gear change signal is input, determining, by the control unit, whether or not a vehicle is located on a flat surface of a road in accordance with a gradient of the road detected by a gradient detector,
    wherein, when the vehicle is determined to be located on the flat surface, the control unit is configured to perform the step of comparing the accelerator pedal input value with the predetermined pedal input set value and subsequent steps.

3. The method of claim 2, wherein, in the determining of whether or not the vehicle is located on the flat surface, the control unit is configured to compare the gradient of the road detected by the gradient detector with a predetermined set gradient, and when the detected gradient of the road is equal to or smaller than the predetermined set gradient, to determine the vehicle to be located on the flat surface.

4. The method of claim 1, wherein, in the comparing of the accelerator pedal input value with the predetermined pedal input set value, the control unit is configured to control information regarding the drive position or the reverse position indicated by the gear change signal to be previously displayed on a cluster while maintaining the gear position of the transmission in the park position.

5. The method of claim 1, further including:
    when the accelerator pedal input value is equal to or greater than the predetermined pedal input set value, determining, by the control unit, whether or not predetermined operation conditions for the automatic releasing of the parking brake are met,
    wherein, when the predetermined operation conditions are met, the control unit is configured to perform the control for the automatic releasing of the parking brake and the control to change the gear position of the transmission to the drive position or the reverse position.

6. The method of claim 5, wherein the predetermined operation conditions include a condition requesting that a driver's seat belt is fastened or the driver's seat belt and a passenger's seat belt are fastened.

7. The method of claim 5, wherein, when the predetermined operation conditions are not met, the control unit is configured to control a message requesting that the operation conditions be met to be displayed on a cluster.

8. The method of claim 1, further including:
controlling, by the control unit, an operation of a drive unit of driving a vehicle so that driving force reduced from driving force of a normal output control is output in accordance with a target driving force determined from the accelerator pedal input value and the predetermined pedal input set value after the control of changing the gear position of the transmission to the drive position or the reverse position.

9. The method of claim 8, wherein the controlling of the operation of the drive unit includes:
comparing, by the control unit, the accelerator pedal input value after the control of changing the gear position of the transmission to the drive position or the reverse position with the predetermined pedal input set value;
when the accelerator pedal input value is equal to or greater than the predetermined pedal input set value, determining, by the control unit, a corrected input value by multiplying a difference between the accelerator pedal input value and the predetermined pedal input set value with a predetermined driving force reduction ratio smaller than 1; and
controlling, by the control unit, the operation of the drive unit to output the reduced driving force corresponding to the determined corrected input value.

10. The method of claim 8, wherein, when the control unit determines that a driver has detached a foot from an accelerator pedal after the control of changing the gear position of the transmission to the drive position or the reverse position, the control unit is configured to perform a normal output control to control the operation of the drive unit to output normal driving force corresponding to the accelerator pedal input value afterwards.

11. The method of claim 8, wherein, when the accelerator pedal input value after the control of changing the gear position of the transmission to the drive position or the reverse position is smaller than the predetermined pedal input set value, the control unit is configured to perform a fine output control of controlling the operation of the drive unit to output predetermined fine driving force.

12. The method of claim 3, further including:
when the control unit determines that the vehicle is located on an inclined surface of the road having a gradient greater than the predetermined set gradient, performing, by the control unit, the control of changing the gear position of the transmission to the drive position or the reverse position;
controlling the operation of a drive unit to output driving force corresponding to the accelerator pedal input value; and
comparing, by the control unit, the accelerator pedal input value with a predetermined default value, and when the accelerator pedal input value is equal to or greater than the predetermined default value, performing, by the control unit, the control for the automatic releasing of the parking brake.

13. An electric parking brake system comprising:
an input unit receiving a signal of shifting;
an accelerator pedal detector configured for detecting a state of an accelerator pedal;
a gradient detector configured for detecting a gradient of a road on which a vehicle is located;
a control unit configured for controlling operation of a transmission and operation of a parking brake,
wherein the control unit is configured for:
monitoring whether or not a gear change signal for changing a gear position of a transmission to a drive position or a reverse position is input through the input unit in a vehicle stopped state, a park position state, or a parking brake applied state;
in response to the gear change signal being input, comparing an accelerator pedal input value received from the accelerator pedal detector with a predetermined pedal input set value while maintaining the gear position of the transmission in the park position;
in response to the accelerator pedal input value being equal to or greater than the predetermined pedal input set value, performing control for automatic releasing of the parking brake; and
in response to a set time passing after start of the control for the automatic releasing of the parking brake, performing a control of changing the gear position of the transmission to the drive position or the reverse position.

14. The electric parking brake system of claim 13, wherein the control unit is further configured to, when the gear change signal is input, determine, whether or not the vehicle is located on a flat surface of a road in accordance with a gradient of the road detected by the gradient detector,
wherein, when the vehicle is determined to be located on the flat surface, the control unit is configured to perform the step of comparing the accelerator pedal input value with the predetermined pedal input set value and subsequent steps.

15. The electric parking brake system of claim 14, wherein, in the determining of whether or not the vehicle is located on the flat surface, the control unit is configured to compare the gradient of the road detected by the gradient detector with a predetermined set gradient, and when the detected gradient of the road is equal to or smaller than the predetermined set gradient, to determine the vehicle to be located on the flat surface.

16. The electric parking brake system of claim 13,
wherein when the accelerator pedal input value is equal to or greater than the predetermined pedal input set value, the control unit is configured to determine whether or not predetermined operation conditions for the automatic releasing of the parking brake are met,
wherein, when the predetermined operation conditions are met, the control unit is configured to perform the control for the automatic releasing of the parking brake and the control to change the gear position of the transmission to the drive position or the reverse position.

17. The electric parking brake system of claim 13, wherein the control unit is further configured for:
controlling an operation of a drive unit of driving the vehicle so that driving force reduced from driving force of a normal output control is output in accordance with a target driving force determined from the accelerator pedal input value and the predetermined pedal input set value after the control of changing the gear position of the transmission to the drive position or the reverse position.

18. The electric parking brake system of claim 17, wherein in controlling of the operation of the drive unit, the control unit is further configured for:
comparing the accelerator pedal input value after the control of changing the gear position of the transmission to the drive position or the reverse position with the predetermined pedal input set value;

when the accelerator pedal input value is equal to or greater than the predetermined pedal input set value, determining a corrected input value by multiplying a difference between the accelerator pedal input value and the predetermined pedal input set value with a predetermined driving force reduction ratio smaller than 1; and controlling the operation of the drive unit to output the reduced driving force corresponding to the determined corrected input value.

19. The electric parking brake system of claim 17, wherein, when the control unit determines that a driver has detached a foot from an accelerator pedal after the control of changing the gear position of the transmission to the drive position or the reverse position, the control unit is configured to perform a normal output control to control the operation of the drive unit to output normal driving force corresponding to the accelerator pedal input value afterwards.

20. The electric parking brake system of claim 15, wherein the control unit is further configured for:

when the control unit determines that the vehicle is located on an inclined surface of the road having a gradient greater than the predetermined set gradient, performing the control of changing the gear position of the transmission to the drive position or the reverse position;

controlling the operation of a drive unit to output driving force corresponding to the accelerator pedal input value; and comparing the accelerator pedal input value with a predetermined default value, and when the accelerator pedal input value is equal to or greater than the predetermined default value, performing the control for the automatic releasing of the parking brake.

* * * * *